(12) United States Patent
Imoto (10) Patent No.: US 6,516,155 B1
(45) Date of Patent: Feb. 4, 2003

(54) CAMERA CAPABLE OF CONTROLLING A CHANGE OF SETTING OF DATA PECULIAR TO A FILM TO BE IMPRINTED ON THE FILM

(75) Inventor: Kazuo Imoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 25 days.

(21) Appl. No.: 09/702,998

(22) Filed: Oct. 31, 2000

(30) Foreign Application Priority Data

Nov. 10, 1999 (JP) ............................................ 11-319164

(51) Int. Cl.⁷ .......................... G03B 17/00; G03B 17/24
(52) U.S. Cl. ........................ 396/297; 396/310; 396/311
(58) Field of Search ................................ 396/281, 284, 396/287, 297, 299, 310, 311, 319, 387, 390, 392

(56) References Cited

U.S. PATENT DOCUMENTS 5,970,264 A * 10/1999 Funaki ....................... 396/299
6,249,649 B1 * 6/2001 Okuno ....................... 396/207

* cited by examiner

Primary Examiner—David M. Gray
Assistant Examiner—Rochelle Blackman
(74) Attorney, Agent, or Firm—Robin, Blecker & Daley (57) ABSTRACT

In a camera having a data setting device capable of setting data peculiar to a film to be imprinted on the film, when a film presence/absence detecting device has detected that a film is loaded in the camera, a data changing control circuit inhibits the data peculiar to a film from being changed. Accordingly, the unintended change of the data peculiar to a film by a photographer can be prevented. Further, when the film presence/absence detecting device has detected that a film is loaded in the camera, the data setting device is made to function for setting data other than the data peculiar to a film. Accordingly, the number of operation members of the camera can be decreased, thereby reducing the size of the camera.

10 Claims, 7 Drawing Sheets

FIG. 5(a) DISPLAY WITH FILM LOADED

FIG. 5(b) DISPLAY WITH FILM NOT LOADED

ize of the camera.

CAMERA CAPABLE OF CONTROLLING A CHANGE OF SETTING OF DATA PECULIAR TO A FILM TO BE IMPRINTED ON THE FILM

BACKGROUND OF THE INVENTION

1. Field of the Invention

The present invention relates to improvements on cameras capable of imprinting data peculiar to a film in an unexposed area of the film.

2. Description of Related Art

Heretofore, as disclosed in, for example, Japanese Laid-Open Patent Application No. Hei 6-67285, there have been known cameras capable of imprinting data peculiar to a film, such as a film serial number, (hereinafter also referred to as a film ID) on a leader portion (hereinafter referred to as a zeroth frame) of the film, which is closer to its front end portion than the first frame thereof. In the cameras of such a kind, the film ID is a numeric value to be inputted by a photographer through an operation member, and is allowed to be changed by the photographer performing a changing operation.

The film ID is peculiar information to be set by the photographer and is also very important information for use in filing developed photographic negatives, photograph prints, or the like. However, if the photographer performs, by mistake, an operation of changing the film ID when a film is in the state of being loaded in a camera, and then loads in the camera another new film in place of the loaded film without noticing the change of the film ID, the changed film ID is imprinted in the zeroth frame of the new film. Such an unintended change of the film ID by the photographer may cause the film ID to become information meaningless for the photographer, because the film ID not intended by the photographer is imprinted on the film.

BRIEF SUMMARY OF THE INVENTION

In accordance with an aspect of the present invention, there is provided a camera, which comprises a data setting device for setting data peculiar to a film to be imprinted in a predetermined area of the film, a film presence/absence detecting device which detects whether a film is loaded in the camera, and a data change control circuit which, when the film presence/absence detecting device has detected that a film is loaded in the camera, inhibits the data setting device from changing the data peculiar to a film, so that an unintended change of the data peculiar to a film by the photographer is prevented, and therefore, the camera is prevented from writing the unintended peculiar data on a film as loaded next.

In accordance with another aspect of the present invention, there is provided a camera, which comprises a data setting device for setting data peculiar to a film to be imprinted in a predetermined area of the film, a film presence/absence detecting device which detects whether a film is loaded in the camera, wherein the data setting device functions for setting data other than the data peculiar to a film when the film presence/absence detecting device has detected that a film is loaded in the camera, so that an unintended change of the data peculiar to a film by the photographer can be prevented, and, further, the number of operation members of the camera can be decreased, thereby reducing the size of the camera.

These and further features and advantages of the present invention will become apparent from the following detailed description of preferred embodiments thereof taken in conjunction with the accompanying drawings.

DETAILED DESCRIPTION OF THE INVENTION

Hereinafter, preferred embodiments of the present invention will be described in detail with reference to the drawings.

Figure 1:
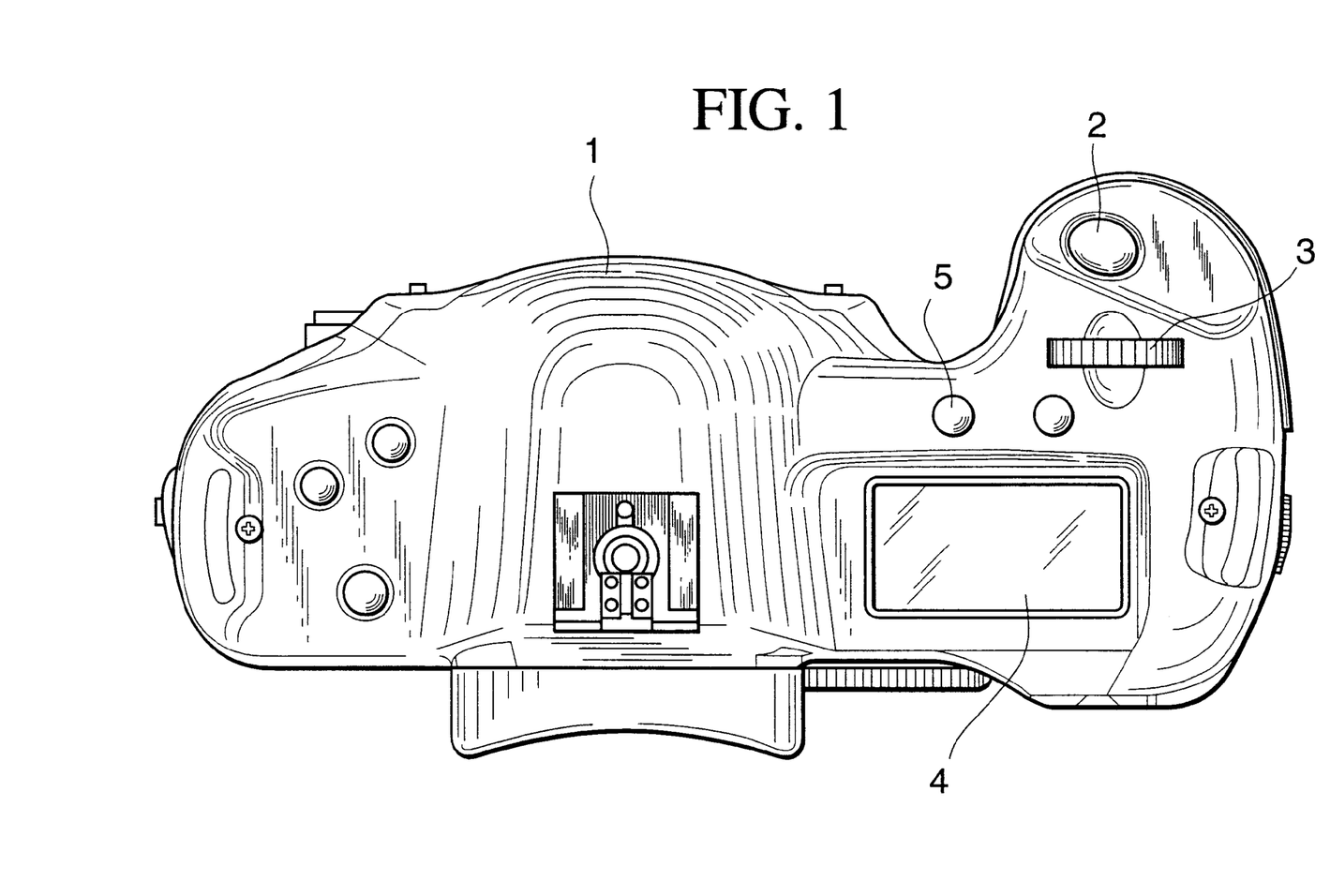
FIG. 1 is a top view showing a camera according to a first embodiment of the present invention.

FIG. 1 is a top view showing a camera according to a first embodiment of the present invention. Referring to FIG. 1, reference numeral 1 denotes a camera body. Reference numeral 2 denotes a release button. The release button 2 is provided with two switches (not shown), i.e., a switch which is turned on by the first stroke operation of the release button 2 to start light measuring and distance measuring actions, and a switch which is turned on by the second stroke operation of the release button 2 to start a release operation for exposure. Reference numeral 3 denotes an electronic dial, which is mounted rotatably on the camera body 1 and is operable to input or change information as required. The electronic dial 3 is provided with a rotary switch (not shown) which is operable to select setting values, such as exposure modes, shutter speeds, and aperture values in forward sequence by turning the electronic dial 3 in one direction or in backward sequence by turning the electronic dial 3 in another direction. Reference numeral 4 denotes an external display LCD (liquid crystal display) for displaying necessary information, and reference numeral 5 denotes a film ID setting button operable for bringing the camera body 1 into a film ID setting mode for setting a film ID. The film ID setting button 5 is provided with a switch (not shown) which is turned on by depressing the film ID setting button 5.

Figure 2:
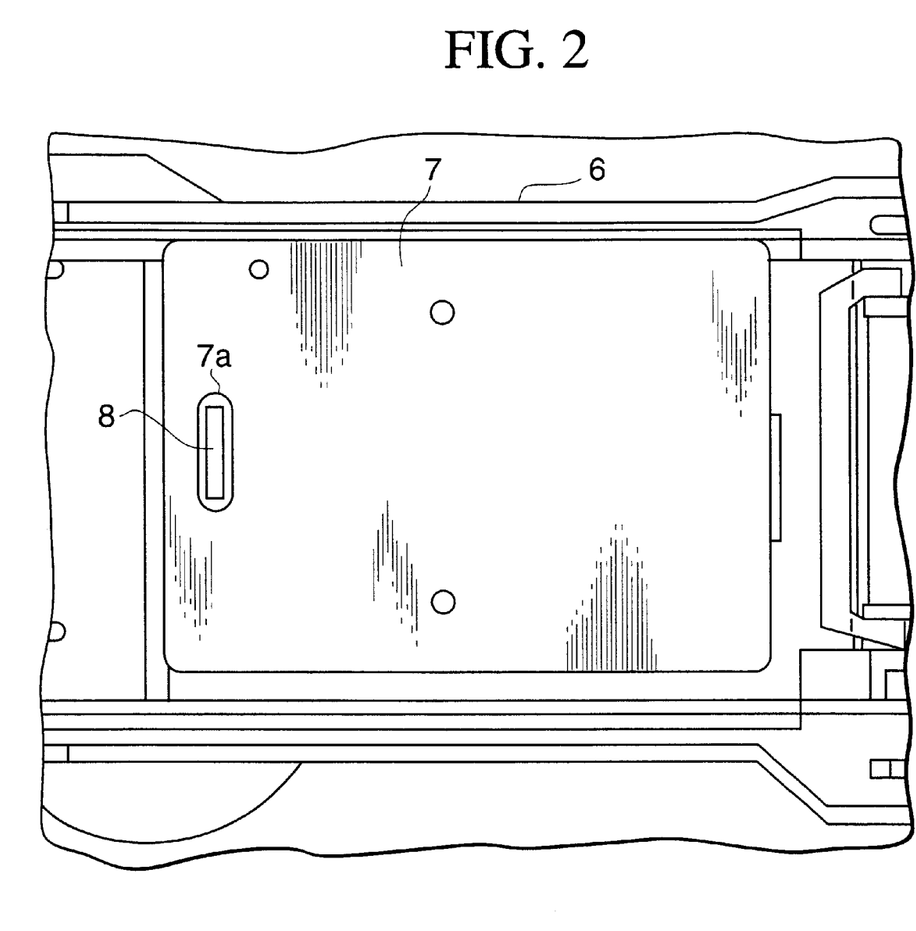
FIG. 2 is a diagram showing a back cover of the camera shown in FIG. 1, as viewed from the inside of the camera.

FIG. 2 is a diagram showing a back cover of the camera shown in FIG. 1, as viewed from the inside of the camera. Referring to FIG. 2, reference numeral 6 denotes the back cover which is pivotally mounted on the camera body 1 around a shaft member (not shown). Reference numeral 7 denotes a pressure plate which is disposed inside the back cover 6 to maintain the flatness of a film. The pressure plate 7 is provided with an opening window 7a for allowing an imprinting LCD 8 housed inside the back cover 6 to expose the film to light for imprinting a film ID.

Figure 3:
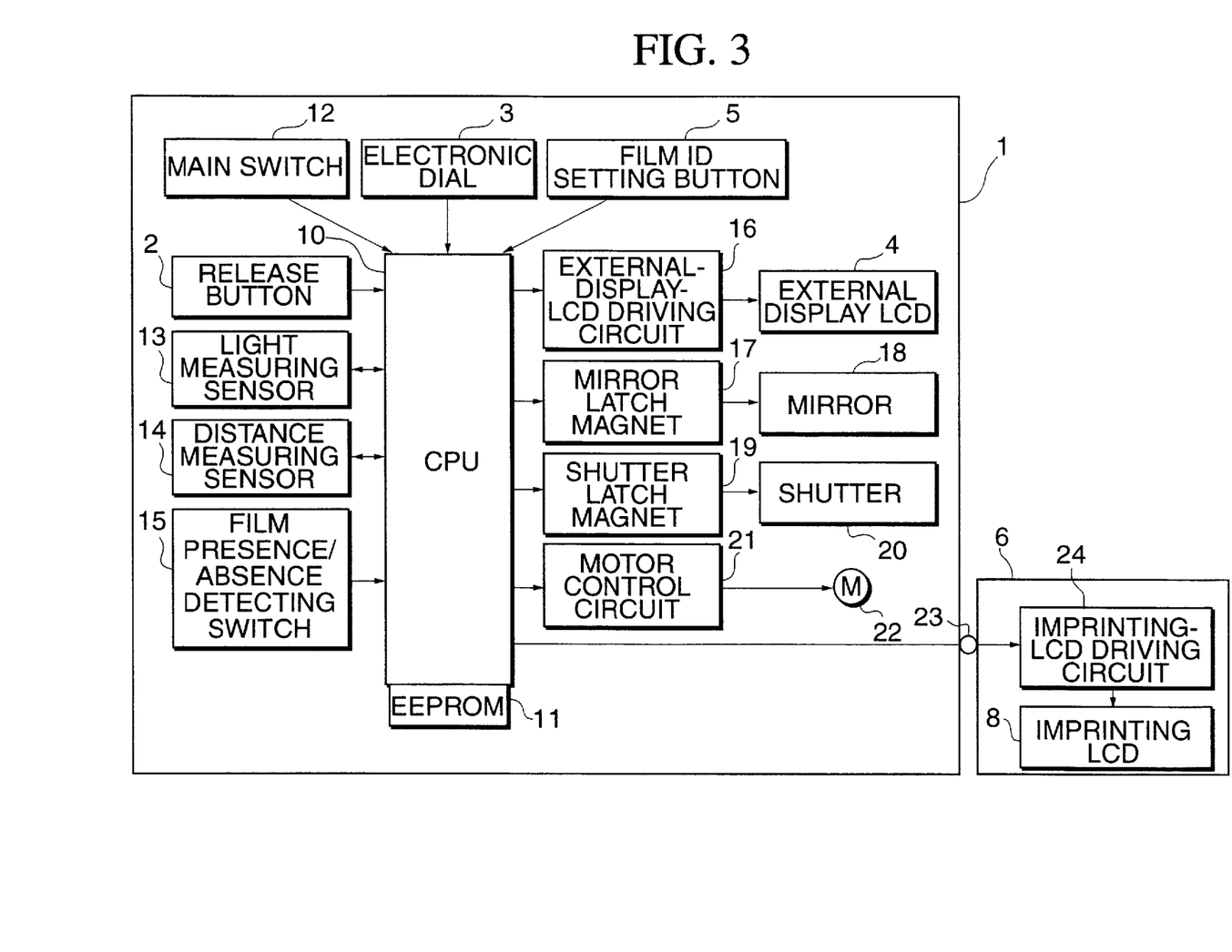
FIG. 3 is a block diagram showing essential components of the electric configuration of the camera according to the first embodiment of the present invention.

FIG. 3 is a block diagram showing essential components of the electric configuration of the camera having the structure mentioned above.

Referring to FIG. 3, reference numeral 10 denotes a CPU (central processing unit) which is built in the camera body 1 to control the whole camera. Reference numeral 11 denotes an EEPROM (electrically erasable programmable read-only memory), serving as a storage means associated with the CPU 10, which has the function of storing various camera function data, various lens information, etc. Reference numeral 12 denotes a main switch for starting of the operation of the camera body 1, reference numeral 13 denotes a light measuring sensor, reference numeral 14 denotes a distance measuring sensor (or a focus detecting sensor) using a known CCD (charge-coupled device) line sensor corresponding to a distance measurement point (or a focusing point), reference numeral 15 denotes a film presence/absence detecting switch for detecting whether a film is loaded in the camera body 1, and reference number 16 denotes an external-display-LCD driving circuit for causing the external display LCD 4 to make a variety of displays.

Reference numeral 17 denotes a mirror latch magnet arranged to cause a mirror 18 to start moving to an exposure ready state (mirror-up) position, and reference numeral 19 denotes a shutter latch magnet arranged to cause the leading curtain and trailing curtain of a shutter 20 to start running. Reference numeral 22 denotes a motor, which performs a charge driving operation for returning the mirror 18 and the shutter 20 to their initial states and a transporting operation for a photographic frame of the film, in response to a control signal from a motor control circuit 21. Reference numeral 23 denotes a signal contact arranged to transmit a signal from the camera body 1 to the back cover 6, and reference numeral 24 denotes an imprinting-LCD driving circuit for causing the imprinting LCD 8 to make a variety of displays.

Figure 4:
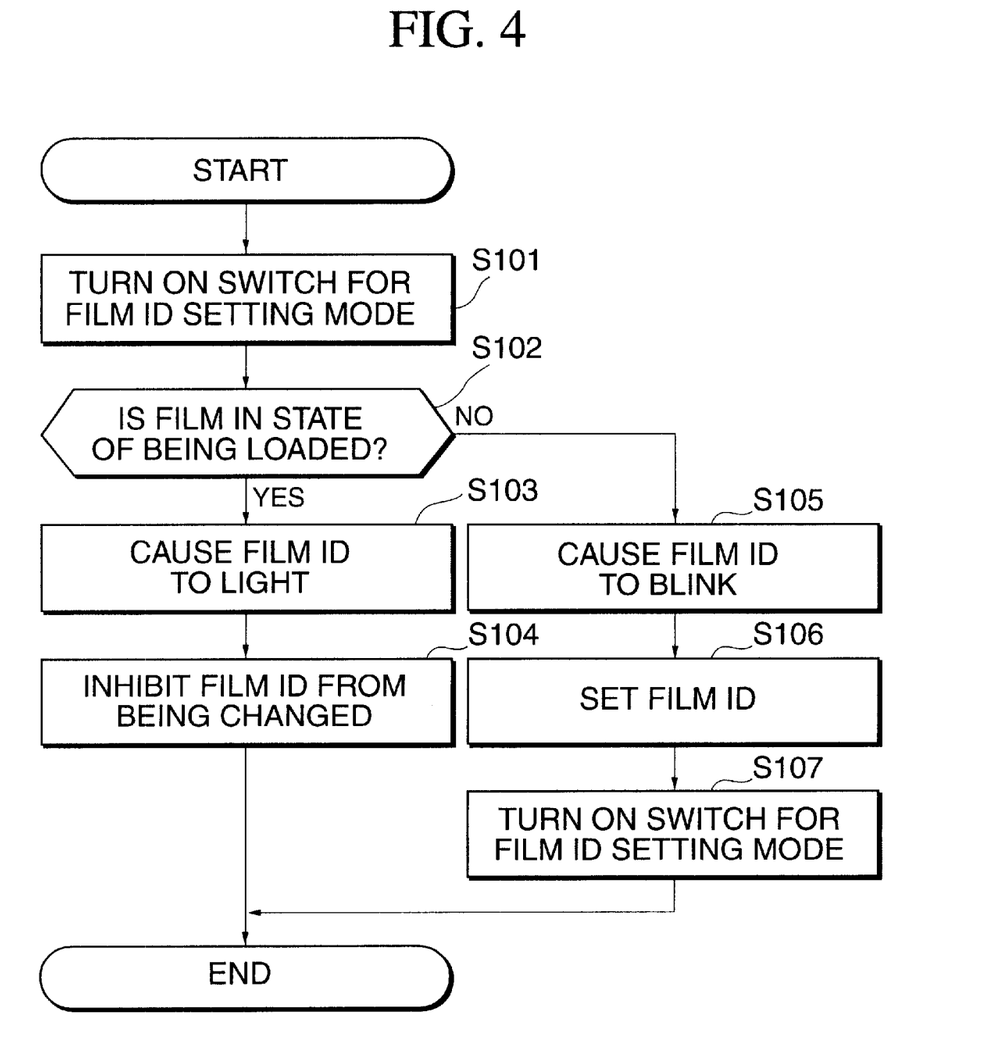
FIG. 4 is a flow chart showing a film ID setting operation in the camera according to the first embodiment of the present invention.
Figure 5A:
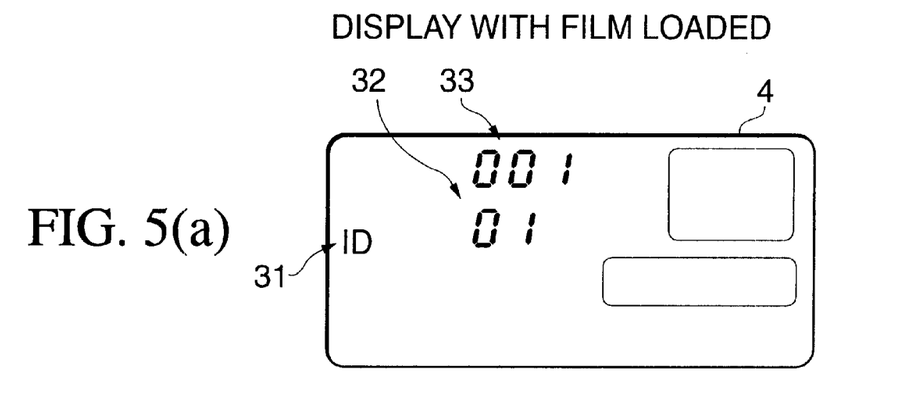
FIGS. 5(a), 5(b), and 5(c) are diagrams showing display states of an external display LCD in the process of a film ID setting mode in the first embodiment of the present invention.
Figure 5B:
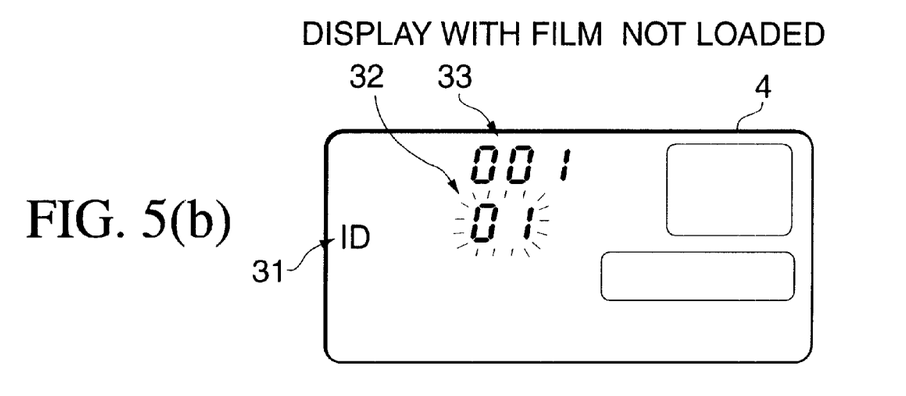
Figure 5C:
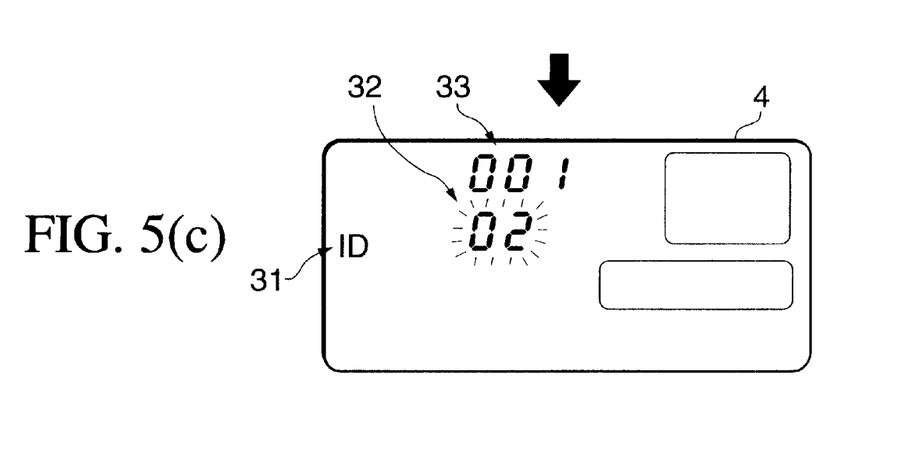

FIG. 4 is a flow chart showing a film ID setting operation of the camera according to the first embodiment of the present invention, and FIGS. 5(a) to 5(c) are diagrams showing display states of the external display LCD 4 in the process of a film ID setting mode. The first embodiment will be described with reference to FIG. 4 and FIGS. 5(a) to 5(c).

First, in step S101 shown in FIG. 4, the CPU 10 brings the camera body 1 from a standby state into the film ID setting mode in response to the turning-on of the film ID setting button 5. Then, in the next step S102, the CPU 10 makes a check to find if whether a film is loaded in the camera body 1, with the film presence/absence detecting switch 15. If it is found as a result of the check made in the step S102 that a film is loaded in the camera body 1, the procedure proceeds to step S103, and if no film is loaded in the camera body 1, the procedure proceeds to step S105. In the step S103, since a film is loaded in the camera body 1, the external display LCD 4 makes such a display as to cause a display part 31 for indicating the setting of the film ID setting mode, a user number display part 32 settable arbitrarily by the photographer and a film number display part 33 arranged to be incremented every time when the automatic loading operation is performed with a film loaded into the camera body 1, to light up as indicated by a display with a film loaded shown in FIG. 5(a). In the next step S104, the CPU 10 inhibits the film ID which is currently set from being changed.

Here, since the user number display part 32 is provided for displaying information which is settable arbitrarily by the photographer, the display content of the film user number display part 32 can be used to identify a particular photographer, to indicate information on the place of photographing, or the like. Further, since the film number display part 33 is provided for displaying information which is incremented every time the automatic loading operation is performed, if the display content of the film number display part 33 and other photographing data of each frame shot on the film, such as a frame count, an exposure mode, a shutter speed, an aperture value, etc., are stored in the EEPROM 11, these data can be used as information for correlating the film with the photographing data of each frame.

In a case where the procedure has proceeded to step S105, the external display LCD4 makes such a display as to cause the user number display part 32 among the currently set film ID information to blink as indicated by a display with a film not loaded shown in FIG. 5(b). In the next step S106, the display content of the user number display part 32 is changed, as shown in FIG. 5(c), in response to the operation of the electronic dial 3. Thus, a new film ID is set. Then, in step S107, in response to the turning-on of the film ID setting button 5, the new film ID set in the step S106 is decided, and the camera body 1 is returned from the film ID setting mode to the standby state.

Imprinting of the film ID onto the film is made in such a manner as to imprint the film ID on the zeroth frame of the film by the imprinting LCD 8 immediately before the completion of the known automatic loading operation.

According to the above-described first embodiment, the camera is arranged so that the film ID can not be changed as long as a film is loaded in the camera body 1. Therefore, even if the photographer performs a changing operation on the film ID by mistake, a situation in which the film ID is changed to new one is avoided.

In addition, the display states of the film ID at the external display LCD 4 are made to differ between the film-ID changeable state and the film-ID unchangeable state, as a blinking display (the state shown in FIG. 5(b) or 5(c)) and a lighting-up display (the state shown in FIG. 5(a)). Accordingly, the photographer can readily recognize the film-ID changeable state or the film-ID unchangeable state of the camera.

Incidentally, although in the first embodiment the film ID is represented by numerals, other characters, such as alphabet letters, may be used without restriction. Further, although in the first embodiment the return of the camera body from the film ID setting mode to the standby state is carried out by operating the film ID setting button 5, any operation member may be used to return the camera body to the standby state.

Figure 6:
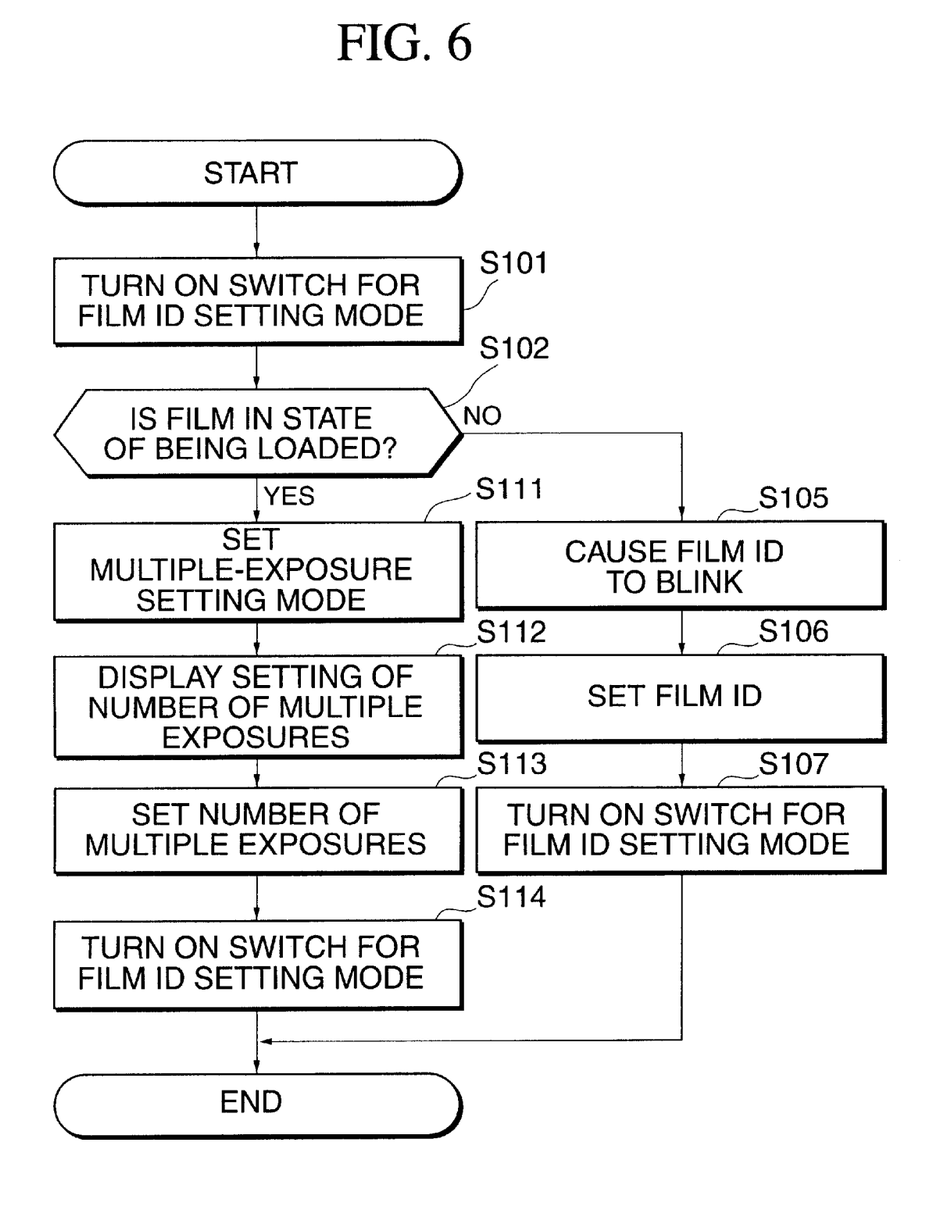
FIG. 6 is a flow chart showing the operation of a main part of a camera according to a second embodiment of the present invention.
Figure 7A:
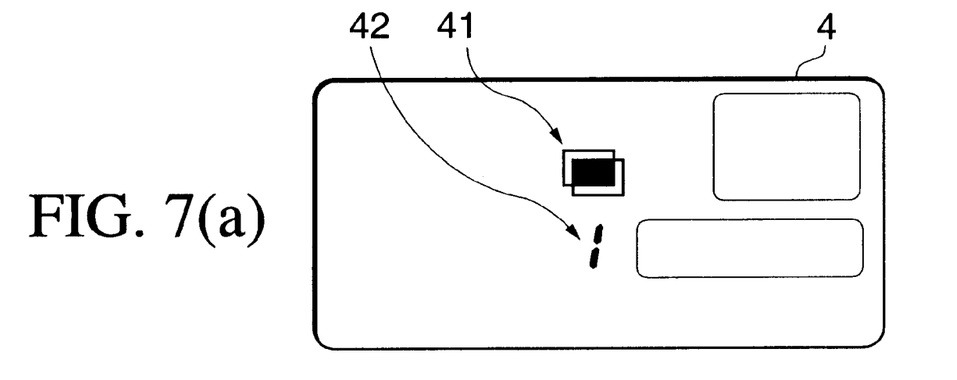
FIGS. 7(a) and 7(b) are diagrams showing display states of an external display LCD in the process of the operation of the camera in the second embodiment of the present invention.
Figure 7B:
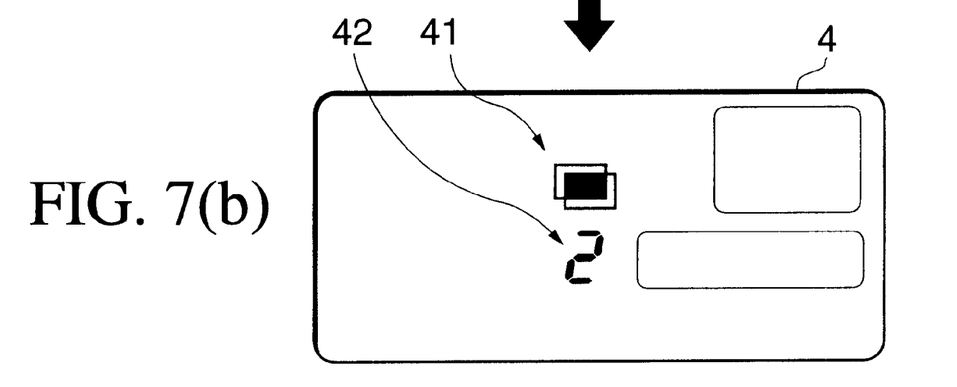

FIG. 6 is a flow chart showing the operation of a main part of a camera according to a second embodiment of the present invention, and FIGS. 7(a) and 7(b) are diagrams showing display states of the external display LCD 4 in the process of the operation of the camera in the second embodiment. The second embodiment will be described below with reference to FIG. 6 and FIGS. 7(a) and 7(b). Since the arrangement of the camera is similar to that in the first embodiment mentioned above, the description thereof is omitted.

Referring to FIG. 6, steps S101 and S102 and step S105 and subsequent steps are similar to those shown in FIG. 4, the detailed description thereof is omitted.

If it is found in the step S102 that a film is loaded in the camera body 1, the procedure proceeds to step S111. In the step S111, the camera body 1 is set to a multiple-exposure setting mode. Then, in the next step S112, the display state of the external display LCD 4 is brought into a state shown in FIG. 7(a).

In FIG. 7(a), reference numeral 41 denotes a multiple-exposure setting mode display part for indicating that the multiple-exposure setting mode is set, and reference numeral 42 denotes a number-of-multiple-exposures display part for indicating the setting number of multiple exposures in the multiple-exposure setting mode. The number-of-multiple-exposures display part 42 is arranged to display numeral "1" if the multiple-exposure setting mode is not set.

In the next step S113, the external display LCD4 displays the changed number of multiple exposures, as shown in FIG. 7(b), obtained in response to the operation of the electronic dial 3. Then, in the subsequent step S114, the changed number of multiple exposures obtained in the step S113 is decided in response to the turning-on of the film ID setting button 5, and the camera body 1 is returned from the multiple-exposure setting mode to the standby state.

According to the above-described second embodiment, the camera is arranged so that the function of the film ID setting button 5 is changed to the multiple-exposure setting function, as long as a film is loaded in the camera body 1. Therefore, the number of operation members of the camera can be decreased.

Although in the second embodiment the function of the film ID setting button 5 when a film is loaded in the camera body is determined to be set to the multiple-exposure setting function, other functions associated with photographing may be used.

According to each of the above-described first and second embodiments, the film ID is inhibited from being changed when a film is loaded in the camera, and, therefore, even if the photographer performs a changing operation on the film ID by mistake, the film ID is not changed. Consequently, a situation in which the film ID not intended by the photographer is imprinted on the zeroth frame of a new film is avoided.

In addition, the display states of the film ID are made to differ between the film-ID changeable state and the film-ID unchangeable state, so that the photographer can readily recognize whether the camera is in the film-ID changeable state or not.

Further, since the film ID setting button is arranged to be used for setting other functions when a film is loaded in the camera, the number of operation members of the camera can be decreased, and, therefore, such effects are produced that the camera can be reduced both in size and cost. Specifically, the same operation member can be used as the data setting member when no film is loaded in the camera and as the number-of-multiple-exposures setting member when a film is loaded in the camera. Accordingly, the number of operation members of the camera can be decreased, and, therefore, the size and cost of the camera can be reduced.

While the present invention has been described with reference to what are presently considered to be the preferred embodiments, it is to be understood that the present invention is not limited to the disclosed embodiments. On the contrary, the present invention is intended to cover various modifications and equivalent arrangements included within the spirit and scope of the appended claims. The scope of the following claims is to be accorded the broadest interpretation so as to encompass all such modifications and equivalent structures and functions.

I claim:

1. A camera comprising:

a data setting device for setting data peculiar to a film to be imprinted in a predetermined area of the film;

a film presence detecting device which detects whether a film is loaded in said camera; and a data change control circuit which forbids said data setting device to change the data peculiar to a film when said film presence detecting device detects that a film is loaded in said camera, and permits said data setting device to change the data peculiar to a film when said film presence detecting device detects that a film is not loaded in said camera.

2. A camera according to claim 1, further comprising:

a display device which displays data set by said data setting device and makes display manners thereof differ between a state in which the data set by said data setting device is allowed to be changed and a state in which the data set by said data setting device is inhibited from being changed.

3. A camera comprising:

a data setting device for setting data peculiar to a film to be imprinted in a predetermined area of the film; and a film presence detecting device which detects whether a film is loaded in said camera, wherein said data setting device functions for setting data other than the data peculiar to a film according to output of the film presence detecting device.

4. A camera according to claim 3, wherein said data other than the data peculiar to a film is data for setting a photographing function of said camera.

5. A camera according to claim 1, wherein said predetermined area of the film is an unexposed area of a leader portion of the film.

6. A camera according to claim 3, wherein said predetermined area of the film is an unexposed area of a leader portion of the film.

7. A camera according to claim 3, wherein said data setting device functions in order to set data other than the data peculiar to a film when said film presence detecting device detects that a film is loaded in said camera, and said data setting device functions in order to change the data peculiar to a film when said film presence detecting device detects that a film is not loaded in said camera.

8. A camera operation method comprising:

setting data peculiar to a film to be imprinted in a predetermined area of the film;

detecting whether a film is loaded in said camera; and controlling data change by forbidding the data setting step to change the data peculiar to a film when the detecting step detects that a film is loaded in said camera, and by permitting the data setting step to change the data peculiar to a film when the detecting step detects that a film is not loaded in said camera.

9. A camera operation method comprising:

setting data peculiar to a film to be imprinted in a predetermined area of the film; and detecting whether a film is loaded in said camera, wherein said setting step sets data other than the data peculiar to a film according to output of the detecting step.

10. A camera according to claim 9, wherein the setting step functions in order to set data other than the data peculiar to a film when the detecting step detects that a film is loaded in said camera, and the setting step functions in order to change the data peculiar to a film when the detecting step detects that a film is not loaded in said camera.

* * * * *